United States Patent
Orritt et al.

(10) Patent No.: US 9,434,625 B1
(45) Date of Patent: Sep. 6, 2016

(54) SYSTEM AND METHOD FOR FLAMEPROOF PROTECTED ENCLOSURE

(75) Inventors: Chris Orritt, Wigan (GB); Richard Joshi, Wigan (GB)

(73) Assignee: ATG R&D LIMITED, Wigan (GB)

( * ) Notice: Subject to any disclaimer, the term of this patent is extended or adjusted under 35 U.S.C. 154(b) by 460 days.

(21) Appl. No.: 13/464,952

(22) Filed: May 5, 2012

(51) Int. Cl.
*C02F 1/32* (2006.01)

(52) U.S. Cl.
CPC ............... *C02F 1/32* (2013.01); *C02F 1/325* (2013.01); *C02F 2201/326* (2013.01)

(58) Field of Classification Search
CPC .. C02F 2209/00; C02F 2209/02; C02F 1/32; C02F 1/325; C02F 2201/326; C02F 2209/42
USPC ......... 169/46, 56, 60, 61, 66, 91; 210/478.1; 250/436, 432 R, 435, 504 R; 422/24
See application file for complete search history.

(56) References Cited

U.S. PATENT DOCUMENTS

| | | | | |
|---|---|---|---|---|
| 6,419,821 B1* | 7/2002 | Gadgil | ............... | B01D 39/2068 210/109 |
| 6,469,308 B1* | 10/2002 | Reed | ......................... | A61L 2/10 250/365 |
| 6,475,433 B2* | 11/2002 | McGeorge | ............... | A61L 2/10 210/748.11 |
| 6,648,174 B2* | 11/2003 | Greene | ............................ | 222/66 |
| 7,002,161 B2* | 2/2006 | Greene | ................... | C02F 1/008 210/94 |
| 8,709,222 B2* | 4/2014 | Gilmore et al. | ........... | 204/278.5 |
| 2002/0139750 A1* | 10/2002 | Boyce | ........................... | 210/652 |
| 2003/0133852 A1* | 7/2003 | Hung | ......................... | 422/186.3 |
| 2004/0007538 A1* | 1/2004 | Siriphraiwan | ............ | A61L 2/10 210/748.11 |
| 2004/0061069 A1* | 4/2004 | Schalble et al. | .......... | 250/432 R |
| 2004/0233063 A1* | 11/2004 | Sorbo et al. | ................... | 340/623 |
| 2005/0000911 A1* | 1/2005 | Thorpe | ........................ | 210/748 |
| 2006/0151369 A1* | 7/2006 | Hegmegi | ...................... | 210/149 |
| 2007/0181509 A1* | 8/2007 | Araiza et al. | ................. | 210/748 |
| 2009/0084734 A1* | 4/2009 | Yencho | ........................... | 210/741 |
| 2009/0321365 A1* | 12/2009 | Eriksson et al. | .............. | 210/741 |

\* cited by examiner

*Primary Examiner* — Arthur O Hall
*Assistant Examiner* — Juan C Barrera
(74) *Attorney, Agent, or Firm* — Ronald J. Koch

(57) ABSTRACT

A system and method for containing a flame originating from a flame source within a fluid containing enclosure includes de-energizing the flame source when the fluid falls below a pre-established level or when the water temperature exceeds a pre-established level.

20 Claims, 2 Drawing Sheets

SYSTEM AND METHOD FOR FLAMEPROOF PROTECTED ENCLOSURE

CROSS REFERENCE TO RELATED APPLICATIONS

Not Applicable

FEDERALLY SPONSORED RESEARCH

Not Applicable

SEQUENCE LISTING, TABLE, OR COMPUTER PROGRAM COMPACT DISK APPENDIX

Not Applicable

CLAIM OF PRIORITY BASED ON COPENDING APPLICATION

Not Applicable

BACKGROUND AND SUMMARY

The present invention relates generally to flameproof protected enclosures and specifically to Ex-d (aka Exd) protected enclosures.

The Ex-d flame protection standard is known. In certain explosion-prone environments, the external enclosure of flame-prone equipment must be designed to withstand an internal explosion so that the explosion cannot be transmitted through to the external environment. For instance, a reactor containing ultra-violet (UV) luminaires for water treatment placed in an explosion-prone environment requires that the reactor housing (aka envelope) be explosion proof. A flame or explosion originating from within the reactor (e.g. from the UV luminaire) must be contained within the envelope including being contained within inlet and outlet connection flanges.

Any devices (e.g. luminaires, probes, sensors) placed within the reactor are connected via Ex-d explosion proof housings. For instance, a UV luminaire for treating water flowing through a reactor is connected with an Ex-d lamp connector housing that will contain any flame originating within the reactor. However, such a flame must also be contained within the entire envelope.

The present invention uses the water within the reactor to contain explosions or flames by ensuring the reactor is full of water. The reactor is safe when full of water. All components are de-energized when the water level falls below a pre-established threshold. This can be accomplished using sensors to detect water level.

A sensor is utilized to confirm the reactor is full of water (in one embodiment, a sensor suitable for a Zone 1 environment is used). Upon sensing the chamber is not full, all power to the reactor is removed. One solution is to do this using as few mechanical components as possible. For instance, using a conductivity or flow switch connected to a contactor.

The sensors are operatively connected to the flame source utilizing conventional electrical cutoff circuitry to de-energize the flame source upon pre-established temperature and/or water levels.

DETAILED DESCRIPTION

Figure 1:
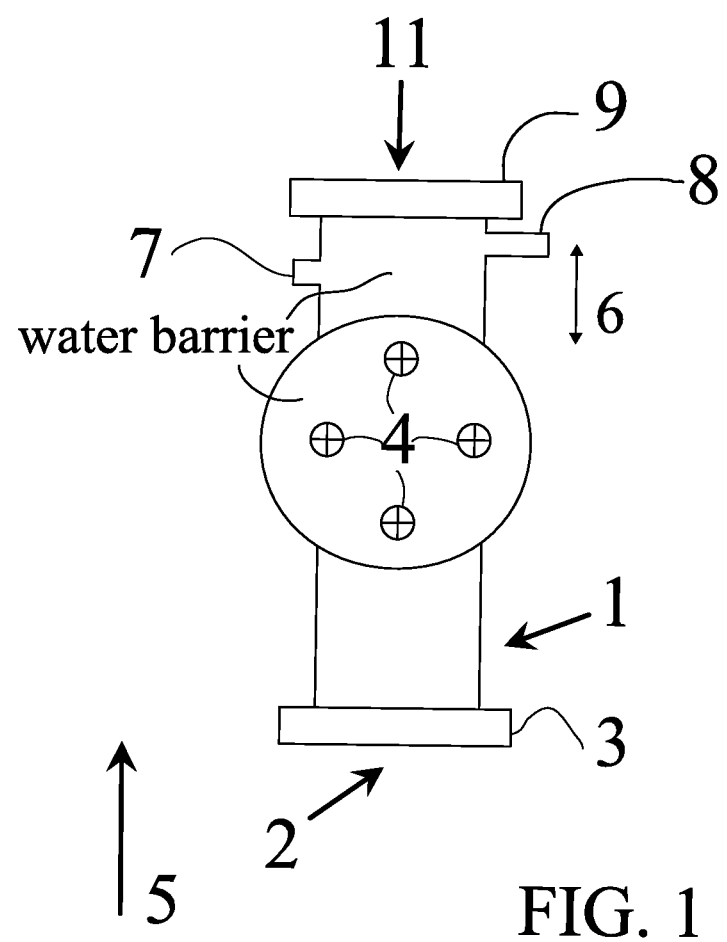
FIG. 1 depicts a frontal view of an X-flow type UV reactor.

Turning now to FIG. 1, a vertical (i.e. "X-flow") reactor is shown wherein UV reactor 1 has inlet 2, inlet connection flange 3, outlet 11, and outlet connection flange 9. Water flows through the reactor as indicated by directional flow arrow 5.

UV lamps 4 (lamp ends depicted in FIG. 1 with lamps going into the page) are disposed within reactor 1 via Ex-d lamp connector 10 (e.g. lamp connectors depicted in provisional patent application Ser. No. 61/504,132, Richard Joshi, et al. for "Probe Housing Assembly", and 61/504,142, Richard Joshi, et al. for "Improved Lamp Connector", both of which are hereby incorporated by reference as if fully rewritten herein) to irradiate the flowing water. Temperature sensor 7 and water level sensor 8 are disposed above UV lamps 4 with water level sensor 8 disposed above temperature sensor 7.

Figure 2:
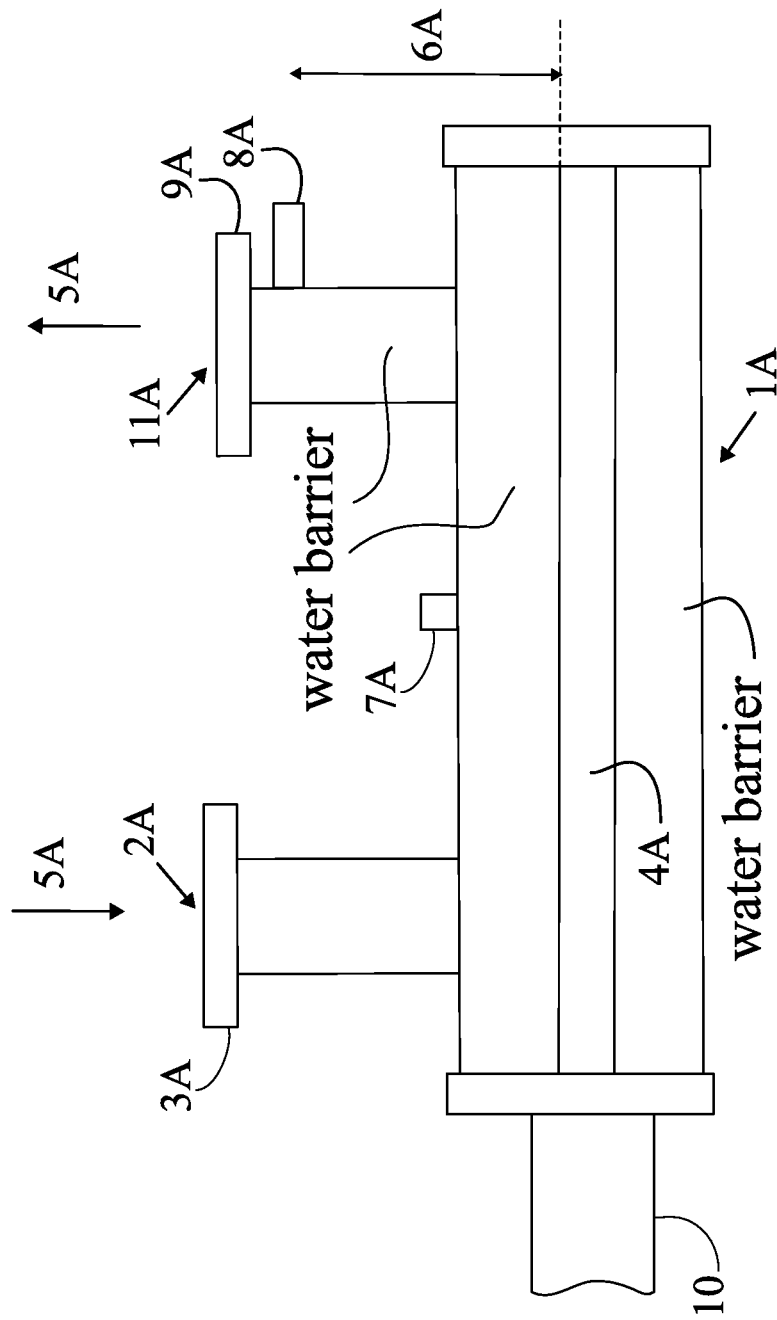
FIG. 2 depicts a side view of an axial type UV reactor.

Turning now to FIG. 2, an horizontal (i.e. "axial flow") reactor is shown wherein UV reactor 1A has inlet 2A, inlet connection flange 3A, outlet 11A, and outlet connection flange 9A. UV lamp 4A is disposed within UV reactor 1A. Water flows as indicated by directional flow arrows 5A. Temperature sensor 7A and water level sensor 8A are disposed above UV lamps 4A with water level sensor 8A disposed above temperature sensor 7A.

One embodiment of a method for containing a flame originating from a flame source within a fluid containing enclosure (aka UV reactor) 1, 1A comprises the step of de-energizing flame source (aka UV lamps) 4, 4A when the fluid falls below a pre-established level. In one embodiment, UV reactor 1, 1A is a fluid fillable enclosure such as a UV water treatment reactor.

In one embodiment, de-energizing flame source 4, 4A when the fluid falls below a pre-established level comprises using fluid level sensor 8, 8A operatively connected to flame source 4, 4A, and disposed vertically above the flame source.

One embodiment of a method for containing a flame originating from a flame source within a fluid containing enclosure comprises the step of de-energizing flame source 4, 4A when the fluid temperature exceeds a pre-established level. In one embodiment, temperature sensor 7, 7A, disposed vertically above the flame source, is used.

One embodiment of a flameproof protected enclosure system comprises fluid containing enclosure 1, 1A having flame source 4, 4A disposed therein; and first sensor (either temperature sensor 7, 7A, or fluid level sensor 8, 8A) disposed vertically above flame source 4, 4A wherein the first sensor is operatively connected to flame source 4, 4A and is operative to de-energize the flame source according to a pre-established sensor input. The first sensor can be either a temperature sensor 7, 7A or a fluid level sensor (e.g. a water level sensor) 8, 8A.

In one embodiment, second sensor 8, 8A is disposed vertically above first sensor 7, 7A wherein the second sensor is operatively connected to the flame source and is operative to de-energize the flame source according to a pre-established sensor input.

Those of skill in the art will appreciate such conventional fluid level and temperature sensors as described and claimed herein. Those of skill in the art will also appreciate such flame sources as UV lamps utilized in UV water treatment reactors.

In one embodiment, fluid level sensor 8, 8A is disposed 150 mm above flame source 4, 4A. In one embodiment, fluid level sensor 8, 8A comprises a conductivity switch (aka a conventional conductivity switch or sensor) connected to a contactor to detect fluid level.

Some embodiments of the present invention incorporate multiple flame sources in the form of UV lamps. It is to be understood that first or second sensors are placed relative to the vertically highest lamp.

What is claimed is:

1. A flameproof protected enclosure system comprising:
a fluid containing enclosure having an inlet, an outlet, and a flame source disposed therein, the outlet being disposed above a topmost portion of the flame source,
a fluid level sensor disposed between the flame source and the outlet wherein the fluid level sensor is operatively connected to the flame source and is operative to de-energize the flame source according to a pre-established input,
and a water barrier entirely surrounding an exposed length of the flame source.

2. The system of claim 1 wherein
the fluid level sensor is disposed 150 mm above the topmost portion of the flame source.

3. The system of claim 1 comprising:
a temperature sensor disposed vertically between the fluid level sensor and the flame source wherein the temperature sensor is operatively connected to the flame source and is operative to de-energize the flame source according to a pre-established sensor input.

4. The system of claim 1 wherein the water barrier is disposed between the flame source and the fluid level sensor.

5. The system of claim 1 wherein the water barrier is substantially 150 mm around the flame source.

6. The system of claim 1 wherein the water barrier is of substantially 150 mm between the flame source and the fluid level sensor.

7. The system of claim 1, wherein the inlet is disposed below a bottommost portion of the flame source.

8. The system of claim 1, wherein the inlet is disposed above a topmost portion of the flame source.

9. The system of claim 1, further comprising an inlet connection flange at the inlet of the fluid containing enclosure and an outlet connection flange at the outlet of the fluid containing enclosure.

10. The system of claim 1, wherein a direction of water flow through the inlet is generally perpendicular to a length direction of the flame source.

11. A flameproof protected enclosure system comprising:
a fluid containing enclosure having an internal fluid chamber, an inlet fluidly coupled to the internal fluid chamber, an outlet fluidly coupled to the internal fluid chamber, and a flame source disposed in the fluid containing enclosure and having an exposed length within the internal fluid chamber, the outlet being disposed above a topmost portion of the flame source, and the inlet being disposed either below the bottommost portion of the flame source or above the topmost portion of the flame source;
a fluid level sensor disposed between the flame source and the outlet wherein the fluid level sensor is operatively connected to the flame source and is operative to de-energize the flame source according to a pre-established input; and
a water barrier entirely surrounding the exposed length of the flame source.

12. The system of claim 11 wherein
the fluid level sensor is disposed 150 mm above the topmost portion of the flame source.

13. The system of claim 11 further comprising:
a temperature sensor disposed vertically between the fluid level sensor and the flame source wherein the temperature sensor is operatively connected to the flame source and is operative to de-energize the flame source according to a pre-established sensor input.

14. The system of claim 11 wherein the water barrier is disposed between the flame source and the fluid level sensor.

15. The system of claim 11 wherein the water barrier is substantially 150 mm around the flame source.

16. The system of claim 11 wherein the water barrier is of substantially 150 mm between the flame source and the fluid level sensor.

17. The system of claim 11, wherein the inlet is disposed below a bottommost portion of the flame source.

18. The system of claim 11, wherein the inlet is disposed above a topmost portion of the flame source.

19. The system of claim 11, further comprising an inlet connection flange at the inlet of the fluid containing enclosure and an outlet connection flange at the outlet of the fluid containing enclosure.

20. The system of claim 11, wherein a direction of water flow through the inlet is generally perpendicular to the exposed length of the flame source.

* * * * *